Nov. 25, 1924.
A. C. BUTTFIELD
1,516,843
MACHINE FOR MAKING ARTICLES OF PLASTIC COMPOUNDS OF DIFFERENT COLORS
Filed May 3, 1922
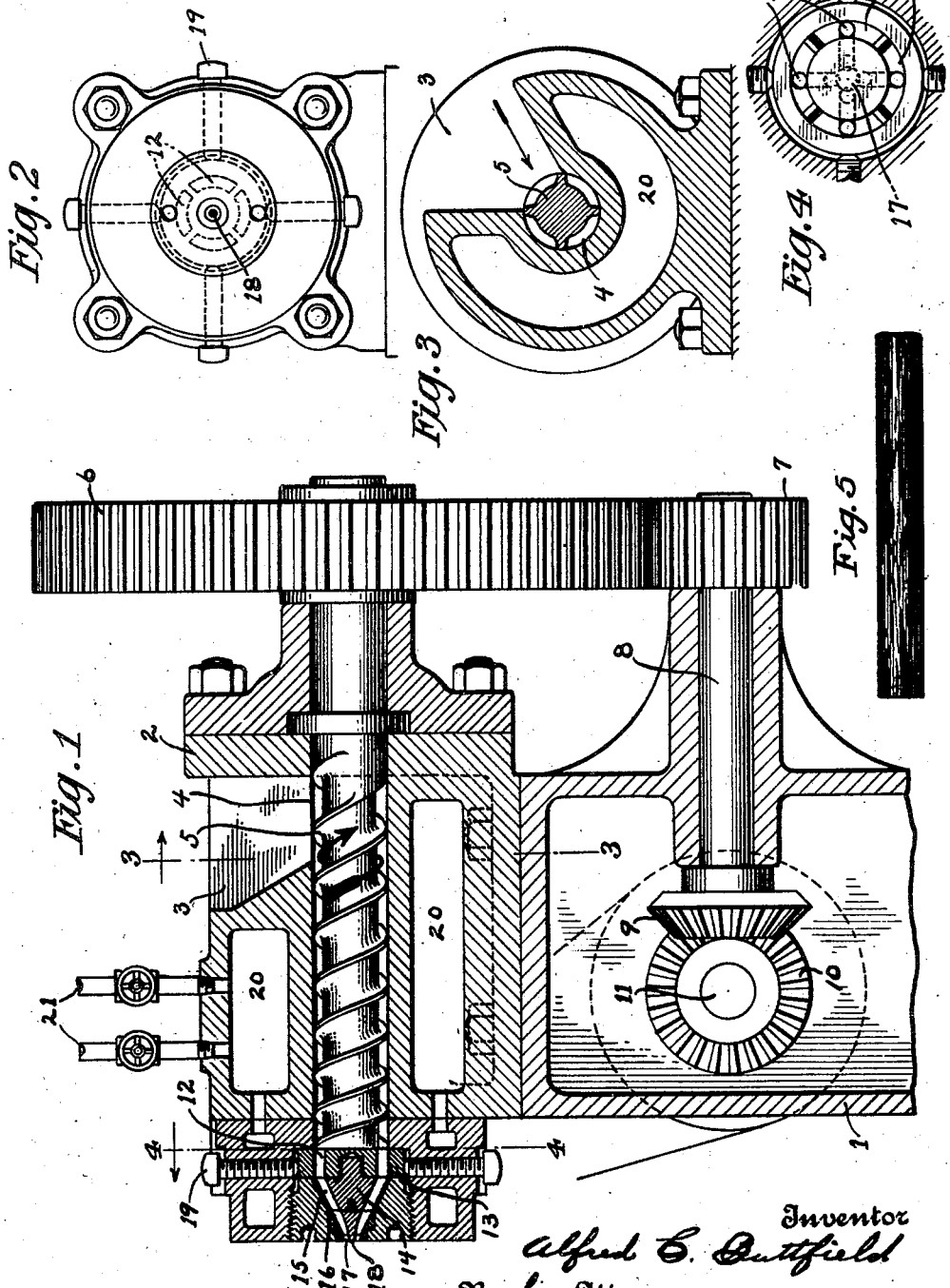
Inventor
Alfred C. Buttfield
By his Attorney Patented Nov. 25, 1924.

1,516,843

UNITED STATES PATENT OFFICE.

ALFRED C. BUTTFIELD, OF BUTLER, NEW JERSEY, ASSIGNOR TO AMERICAN HARD-RUBBER CO., OF NEW YORK, N. Y., A CORPORATION OF NEW YORK.

MACHINE FOR MAKING ARTICLES OF PLASTIC COMPOUNDS OF DIFFERENT COLORS.

Application filed May 3, 1922. Serial No. 558,293.

*To all whom it may concern:*

Be it known that I, ALFRED C. BUTTFIELD, residing at Butler, in the county of Morris and State of New Jersey, have invented new and useful Improvements in Machines for Making Articles of Plastic Compounds of Different Colors, of which the following is a full, clear, and exact description, such as will enable others skilled in the art to which it appertains to make or use the same.

This invention relates to a machine similar to that shown in my copending application, Serial Number 558,292, for making rods, tubes, or the like, of plastic compounds of two or more colors, and the objects of the invention are to improve the appearance of said rods or tubes by giving them the grained appearance of wood.

To the accomplishment of the above objects and to such others as may hereinafter appear, the invention comprises a machine for incompletely mixing or streaking a plurality of plastic compounds of contrasting colors, each with the other, separating the same by forcing the incomplete or streaked mixture through a plurality of passageways, and subsequently joining the various mixtures just previous to the time the same is forced through a common orifice, which thereby acts to give to the finished article a very pleasing appearance resembling the grained appearance of wood.

While the invention is to be described with particular reference to the use of plastic hard rubber compounds of different colors, and to a machine for forming said compounds, the same is not to be considered as limited thereto, as the machine is adapted for use with other plastic compounds.

In the drawings:

Figure 1 is a longitudinal sectional view of a machine made in accordance with the invention.

Figure 2 is an end view of the head block.

Figure 3 is a transverse sectional view on the line 3—3 of Fig. 1.

Figure 4 is a transverse sectional view on the line 4—4 of Fig. 1.

Figure 5 is a view of the finished article showing the grained appearance.

Referring to the drawings, 1 designates the frame of the machine upon which is mounted a head block 2 provided with a feed opening 3 which communicates with a centrally located screw chamber 4 in which is rotatably mounted a feed screw 5.

The body of the feed screw 5 extends at one end beyond the side of the head block 2 and has keyed thereto a large gear 6 for turning the same. In the present instance the large gear 6 is arranged to mesh with a pinion 7 keyed to one end of a short shaft 8 mounted in the frame 1. The other end of the short shaft 8 has keyed thereto a bevel pinion 9 which meshes with a bevel pinion 10 secured to a driving shaft 11 also mounted in the frame through the medium of which the feed screw 5 is operated.

In the present instance and in accordance with the present invention, the feed screw 5 extends substantially the entire length of the head block 2, the same being arranged to terminate adjacent annular openings 12 provided in a guide block 13 secured to the head block 2. The central portion of the guide block 13 is adapted to removably hold a feed block 14 which is provided with a plurality of spaced passageways 15 through which the material fed by the feed screw 5 is fed or squeezed to a discharge block 16 having a contracted orifice 17.

In the present instance the feed block 14 is provided with a removable extension 18 which extends beyond the end of the passageways 15 into the center of the orifice 17 so that the material as it is forced out will form a tube. It is obvious that when the extension 18 is removed the material as it is forced out through the orifice 17 will form a rod.

The guide block 13 to which the feed block 14 is secured, is adjustably mounted, in the present instance, in the head block 2 by means of suitable set screws 19 which permits of the same being adjusted to regulate within small limits the feed block 14.

The head block 2 is preferably jacketed, as shown at 20, to permit of water at various temperatures being admitted through the medium of pipes 21 to regulate the temperature of the screw chamber 4.

In accordance with the present invention, black hard rubber compound and red hard rubber compound, or any two or more hard rubber compounds preferably of contrasting colors, may, for example, and preferably without mixing, be fed into the feed opening 3.

At the time the hard rubber compounds are fed into the feed opening 3 the same are at a suitable temperature for mixing and would ordinarily be pretty thoroughly mixed by the time the same reached the end of the feed screw 5, at which time the hard rubber compounds originally of different contrasting colors would be substantially one uniform color. In order to overcome this difficulty water at a suitable temperature is circulated in the jacket 20 through the medium of the pipes 21 which acts to keep the screw chamber 4 at a suitable temperature to prevent mixing, the action of the feed screw 5 being such as to force the different colored compounds together so as to incompletely mix or streak the different colored compounds together one with the other.

In the present instance and in the further operation of the machine, the black hard rubber compound streaked with red hard rubber compound is forced, in the present instance, into the annular recesses 12 from which the streaked compound is forced through the passageways 15 into the contracted orifice 17 to form the finished article.

The black hard rubber compound streaked with red hard rubber compound forms straight lines of various lengths and of contrasting colors, giving a grained appearance to the finished article which extends all the way through the same, the beauty of the article being enhanced by cutting, to further expose the grained effect.

From the above it will be seen that means are provided for incompletely mixing or streaking plastic compounds of different colors one with the other, and dividing said plastic compounds into separate passageways through which they are forced to a contracted orifice to produce the finished article with a grained appearance.

While the invention has been described with particular reference to the details of construction, the same is not to be considered as limited thereto, as many changes can be made and still fall within the scope of the invention set forth in the following claims.

What I claim is:

1. A machine for graining plastic compounds which comprises a chamber, means for feeding a plurality of plastic compounds of different colors through said chamber and pressing the same together, means for controlling the temperature of said chamber to prevent mixing of said compounds, a plurality of converging passageways, said feed means being adapted to force said plastic compounds through said passageways, and a discharge block having an orifice, said feeding means continuing to force said plastic compounds from said passageways through said discharge block to produce a grained effect in said compound.

2. A machine for graining plastic compounds which comprises a screw chamber, a feed screw for feeding a plurality of plastic compounds of different colors through said screw chamber, means for controlling the temperature of said screw chamber to prevent mixing of said compounds, a plurality of converging passageways, said feed screw being adapted to force said plastic compounds through said passageways, and a discharge block having an orifice, said feed screw also acting to force said plastic compounds from said passageways through said discharge block to produce a grained effect in said compound.

3. The process of graining plastic compounds which consists in mixing but incompletely blending a plastic compound of one color with a plastic compound of a different color, subjecting said compounds to a temperature which will prevent the complete blending thereof, separating said mixed compounds while in a plastic state into a plurality of parts, and finally forcing said parts together to form a grained compound of contrasting colors.

In testimony whereof I have signed this specification in the presence of two subscribing witnesses.

ALFRED C. BUTTFIELD.

Witnesses:
D. E. JONES,
K. J. DURANT.